United States Patent

Frederickson et al.

[15] 3,698,455
[45] Oct. 17, 1972

[54] VIBRATION ISOLATION AND BUMPER SYSTEM

[72] Inventors: Robert Eugene Frederickson, South Gate; John Louis Zimmerer, Torrance; Jay Richard Bailey, Woodland Hills, all of Calif.

[73] Assignee: McCulloch Corporation, Los Angeles, Calif.

[22] Filed: June 26, 1970

[21] Appl. No.: 50,163

[52] U.S. Cl. ........................... 143/32 R, 173/162
[51] Int. Cl. ............................................. B27b 17/02
[58] Field of Search ........ 143/32; 16/116 T; 173/162, 173/139; 267/137, 141

[56] References Cited

UNITED STATES PATENTS 3,542,095   11/1970   Fredrickson et al. ......... 143/32

*Primary Examiner*—Donald R. Schran
*Attorney*—Burns, Doane, Swecker & Mathis

[57] ABSTRACT

A chain saw comprising first and second assemblies. The first assembly generates mechanical vibrations and may include an internal combustion engine, a cutting chain with a guide bar and a drive system. The second assembly comprises an inertia mass and may include a fuel tank and a carburetor. Vibration isolation means connect the two assemblies and a handle network may be provided to define a cage-like structure connected with the second assembly. The first assembly is resiliently supported within the cage-like network by the vibration isolation means and bumper devices are associated therewith to preclude the failure of the resilient vibration isolation means due to unusual shearing influences being applied thereto. The axis of rotation of a crank shaft within the engine and the cutting plane of the overall saw are arranged to direct a substantial portion of the total vibrational energy along a primary plane of vibration. The vibration isolation means and the bumper devices are generally aligned with, and cooperate to absorb shock energy directed along, this primary plane. The vibration isolation means may be arranged to absorb vibration in shear and the bumper devices may be arranged to absorb energy generally in compression.

14 Claims, 8 Drawing Figures

PATENTED OCT 17 1972

INVENTORS
ROBERT EUGENE FREDERICKSON
JOHN LOUIS ZIMMERER
JAY RICHARD BAILEY

BY Burns, Doane, Benedict,
Swecker & Mathis

ATTORNEYS

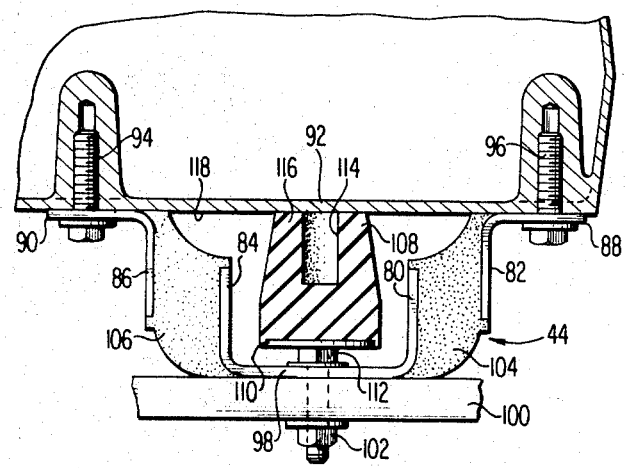
FIG. 3
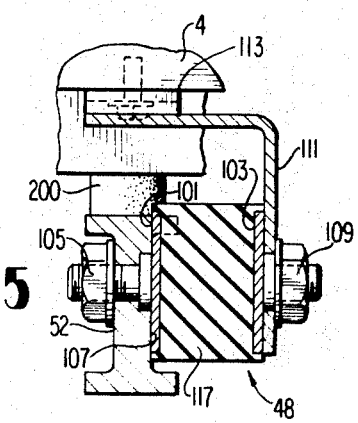
FIG. 5
FIG. 4
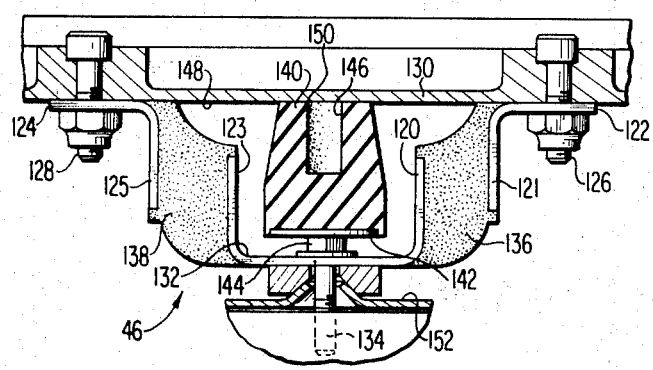
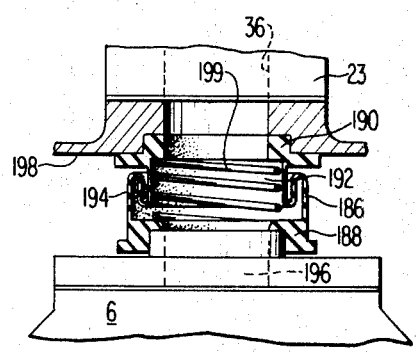
FIG. 8
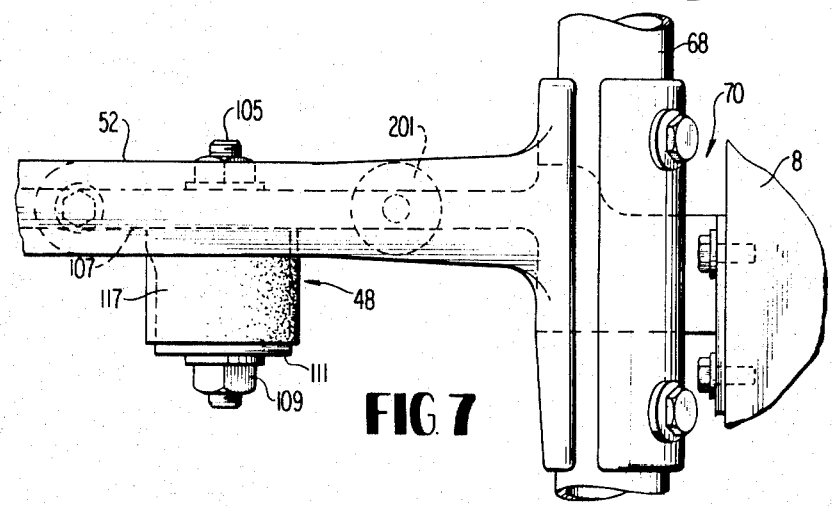
FIG. 7

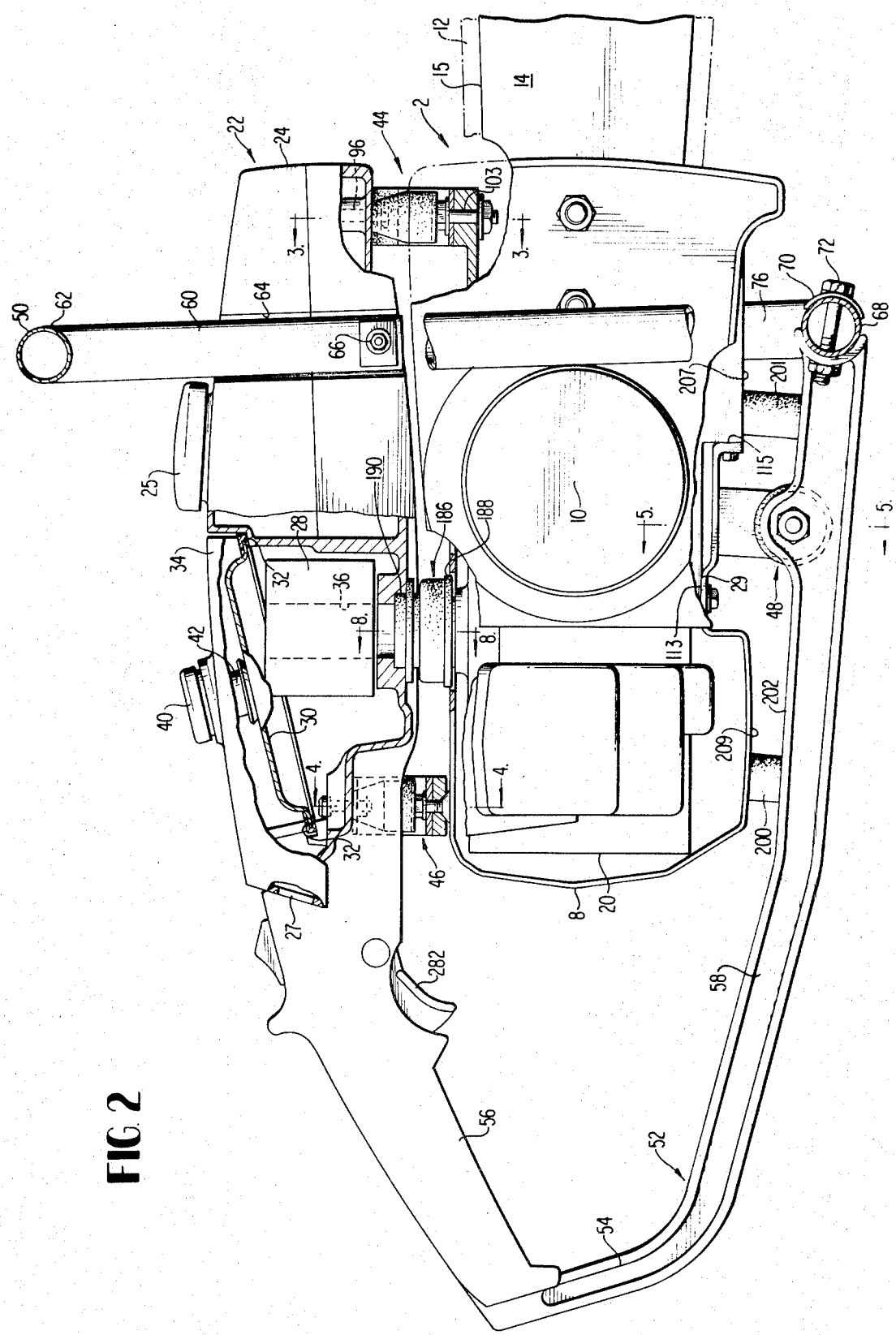

VIBRATION ISOLATION AND BUMPER SYSTEM

BACKGROUND OF THE INVENTION

It has long been recognized that portable chain saws are characterized by a high degree of vibration which tends to cause operator fatigue when a chain saw is used for an extended period of time.

For years, efforts have been expended to reduce the level of vibration transmitted to an operator by portable chain saws. A U.S. Pat. No. 3,372,718 issued to Irgins discloses a system wherein the vibrating components of a chain saw generate vibrations in a plurality of planes. Vibration isolating means are provided by Irgins which means are aligned with only one of these vibration planes and are so arranged as to substantially increase the width or lateral bulk of the portable chain saw. The Irgins arrangement requires a vibration isolation coupling in the drive between an engine and a cutter chain. This requirement produces the disadvantages of structural complexity and reduced efficiency in the application of force from the handle through the chain saw to the cutter chain.

A U.S. Pat. Application Ser. No. 750,082 filed by Robert Frederickson et al. on Aug. 5, 1968, now U.S. Pat. No. 3,542,095, and assigned to the assignee of the present invention discloses a very successful vibration isolation system for a portable chain saw. The Frederickson et al. arrangement provides a unique synergistic interaction between an inertia assembly of a chain saw which assembly encircles the vibration generating engine and cutting apparatus and is secured thereto by a cradle arrangement of shock absorber units encircling the center of mass of the vibrating assembly. The cradle arrangement of shock absorber units lies generally in a primary plane of vibration extending transversely of the axis of the crank shaft rotation of the vibrating mass cradled within the inertia assembly to provide a uniquely effective shock absorber action.

U.S. Pat. No. 3,409,056 issued to Rauh shows a chain saw vibration isolation system incorporating a lateral arrangement of vibration isolation units. Frederickson and others found that a vertically planar arrangement of vibration units produced far better results than the lateral arrangement shown by Rauh. Even though the unique arrangement of shock absorbers disclosed in the Frederickson et al U. S. application Ser. No. 750,082 provides a significant improvement in vibration absorption for portable chain saws, it has been found that the resilient shock absorbing members used in such a portable chain saw may tend to fail in shear when subjected to unusual strain during wood cutting operations.

Although, it had been generally thought that relatively hard, resilient stop members would reduce the efficiency of the resilient vibration absorbers, it has unexpectedly been found through the continuing efforts of the assignee corporation that various arrangements of bumper devices may be used in combination with the shock absorber system of the Frederickson et al. U. S. Pat. application Ser. No. 750,082 without reducing the damping efficiency thereof. These members are operable to limit the degree of available relative movement between the first and second assemblies of chain saws of the type disclosed in the aforementioned Frederickson et al. application and to thereby substantially reduce the tendency of the vibration isolation units to fail in shear.

OBJECTS AND SUMMARY OF THE PRESENT INVENTION

It is therefore an object of the present invention to provide an improvement in vibration isolation systems for chain saws which improvement solves many of the problems which have heretofore been confronting the portable chain saw industry. It is another object of the present invention to provide an i improvement in vibration isolation systems for chain saws which improvement reduces the tendency of resilient elastomeric shock absorber units of portable chain saws to shear when subjected to unusual strain.

It is still another object of the present invention to provide an improvement in chain saw vibration isolation systems of the type wherein vibration is predominantly absorbed in shear wherein the relative movement between the various assemblies of the chain saw is limited without reducing the vibration absorption capacity provided by the vibration isolating system.

SUMMARY OF THE INVENTION

In accomplishing at least some of these objectives, a chain saw is provided comprising a vibrating assembly and an inertia assembly. The inertia assembly is formed with a handle network adapted to be hand held by a chain saw operator. The vibrating assembly is mounted on the inertia assembly by means of resilient vibration mounts and bumper means are provided for limiting the relative movement between the first and second assemblies. The bumper means are operable to absorb shock generally in compression and are generally aligned in a primary plane of vibration of the overall saw.

BRIEF DESCRIPTION OF THE DRAWINGS

While the present invention is particularly pointed out and distinctly claimed in the concluding portion of the specification, a preferred embodiment is shown in the following detailed description which may best be understood when read in connection with the accompanying drawings in which:

FIG. 2 is a side elevation view of the chain saw shown in FIG. 1 partially sectioned to show the members and arrangement of the present invention;

FIG. 3 is a transverse sectional view of the chain saw shown in FIGS. 1 and 2 illustrating the structural details of a vibration isolation unit and bumper device mounted generally adjacent a guide bar of the chain saw as viewed along the section line 3—3 of FIG. 2;

FIG. 4 is a transverse sectional view of the chain saw shown in FIGS. 1, 2 and 3 viewed along a section line 4—4 of FIG. 2 and illustrating the structural detail of a vibration isolation unit with an optional bumper device mounted generally adjacent a carburetor housing of a chain saw;

FIG. 5 is a transverse sectional view of the chain saw shown in FIG. 2 viewed along the sectional line 5—5 of FIG. 2 and illustrating the structural detail of a third vibration isolation unit mounted on the underside of the chain saw adjacent two bumper devices and serving to connect an engine, guide bar, cutting chain and drive unit assembly with the handle network of the chain saw;

FIG. 7 is a bottom plan view of a portion of the assembly shown in FIG. 5 illustrating the structural details of the third vibration isolation unit; and FIG. 8 provides a transverse sectional view of the FIG. 2 assembly, as viewed along section line 8-8 of FIG. 2 and illustrates the structural details of a flexible conduit defining a passage through which air and fuel may pass from a carburetor to an engine intake port.

DETAILED DESCRIPTION OF THE PREFERRED EMBODIMENT

Figure 1:
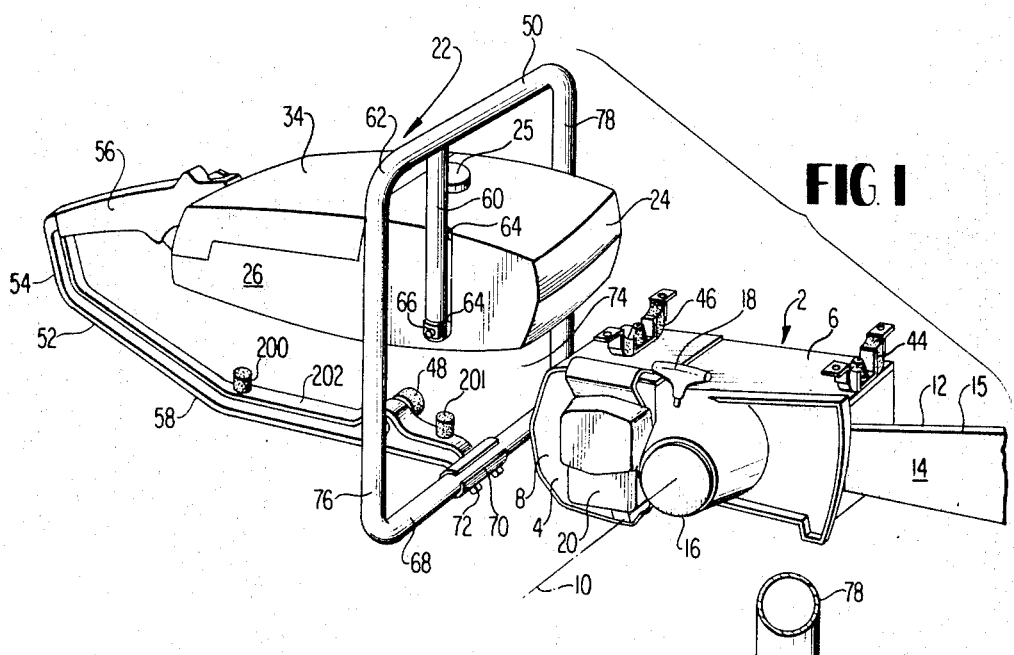
FIG. 1 shows a perspective, exploded view of the basic arrangement of a chain saw, illustrating mutually isolated principal components, vibration isolation units, bumper devices, and a cage network defined by interconnecting and mutually inclined handles.

Referring now to the drawings in which like numerals are used to indicate like parts in the various views thereof, FIGS. 1 and 2 show the overall assembly of the chain saw comprising the present invention.

A vibration generating assembly 2 is of a unitized nature and includes an internal combustion engine 4 which may consist of a cast cylinder or engine housing 6 wherein a reciprocating piston (not shown) is operatively mounted. A shroud 8 partially houses the aftermost end of the engine housing 6. The piston may be connected with a crank shaft (also not shown) in a conventional manner so that the crank shaft is provided with an axis of rotation 10. A crank shaft may be connected by a drive chain (not shown) in a conventional manner to a cutting chain 12.

A generally planar and vertically extending guide bar 14 is provided for mounting the cutter chain 12 movably thereon. The cutting chain 12 may be of the conventional type comprising an endless link-type chain mounted in a groove 15 defined in the periphery of and circumscribing the guide bar 14. The cutting chain 12 is thereby operatively mounted to follow a path of travel defined by the peripheral groove 15 formed about the guide bar 14. This travel path is arranged to align with a vertical cutting plane extending longitudinally of the generally vertically extending planar guide bar 14. The drive chain (not shown) may also be of a conventional nature and may be provided for interconnecting the crank shaft with the cutter chain 12. The drive chain may include a centrifugal clutch (not shown) which may be housed within portion 16 of the overall housing of the chain saw. A starter mechanism may be provided for the chain saw and, in the preferred embodiment, comprises a manually operated pull cord and handle mechanism 18. A spark arrestor and sound muffling device 20 may also be incorporated within the chain saw assembly and unitized with the engine 4.

The piston, which supplies the power to drive the chain saw, may be connected with the crank shaft so as to reciprocate along a path extending generally longitudinally and parallel with the previously defined cutting plane and guide bar 14. This path taken by the power piston may also be generally aligned with a longitudinal median plane 11 (see FIG. 6) which extends longitudinally of the overall chain saw and is disposed in general parallel relationship with the cutting plane and guide bar 14.

The internal combustion engine 4, the piston and crankshaft assembly, the clutch housed within portion 16 of the unitized assembly 2, the starter mechanism 18, the guide bar 14, and the cutting chain 12 and drive chain may all be connected in a manner which is well recognized in the chain saw art and shown in detail in FIGS. 1 and 2. An example of such a conventional arrangement is disclosed in a publication entitled, "McCulloch Shop Manual McC 1–10 and McC 2–10" published in 1965 by the McCulloch Corporation of Los Angeles, Calif.

A second unitized assembly 22 comprises the remaining portion of the overall chain saw and may include a unitary housing defining a fuel tank 24 which is disposed at a forward end thereof adjacent the guide bar 14. A closure cap 25 may be provided on an upper surface of the tank portion 24 to permit access to the interior of the fuel tank through an opening disposed thereunder. An after section 26 of the fuel tank assembly 24 is located generally adjacent and above the engine assembly 6 and houses a conventional carburetor 28 (see FIG. 2). An air filter 30 may be secured above the carburetor 28 on a housing ledge 32 and may be secured in place by a removable cover member 34. The fuel tank 24 is operable to supply fuel to the carburetor 28. The member 34 may be provided with air openings 27 to permit air flow for passage through the filter 30 to the upper end of an induction passage 36 of the carburetor 28. The cover 34 may be secured in place by a threaded fitment 40 which may be formed to threadedly engage with a threaded stud 42 which may be mounted on and extend upwardly from the overall carburetor assembly 28.

The general structural arrangement and cooperative interaction of the fuel tank 24, the after section 26, the carburetor 28, the air filter 30, and the removable closure member 34 is described in the aforementioned McCulloch publication.

FIG. 2 of the drawing shows the operational relationship of the first assembly 2 with respect to the second assembly 22 wherein the second assembly 22 is superposed above the first assembly 2 when the guide bar 14 is disposed in a position operable for cutting in a substantially vertical plane. A first vibration isolation means 44 may be interposed between the first and second assemblies generally adjacent the guide bar 14. A second vibration isolation unit 46 may be interposed between the first assembly 2 and the second assembly 22, generally adjacent the cylinder 6 and the carburetor 28. A third vibration isolation unit 48 may be mounted adjacent the underside of the first assembly 2.

A first handle member 50 may be disposed about the entire chain saw to fully encircle the superposed, first and second assemblies in an area generally adjacent to the guide bar 14. The first handle means 50 extends generally transversely of the cutting plane of the guide bar 14 and the cutting chain 12. A second generally U-shaped handle member 52 may be connected with the second assembly 22 and the third vibration isolation unit 48. The handle member 52 may include a generally U-shaped end portion 54 and a pair of vertically extending spaced leg portions 56 and 58. The upper leg portion 56 may be attached to and integrated with a portion of the second assembly 22. The lower leg 58 may be connected with the third vibration unit 48 which, in turn, is connected with the first unitized assembly 2. The handle member 50, at each side thereof, extends generally longitudinally of or parallel to, the longitudinal median plane 11 (shown in FIG. 6) and is preferably aligned therewith.

A generally vertically extending, force transmitting member 60 may be connected with an upper portion 62 of the handle 50 and is operable to transmit a force from the upper portion 62 of the handle 50 to the second unitary assembly 22. The supporting member 60 may be connected to a recessed side portion 64 of the fuel tank portion 24 of the second inertia mass assembly 22. Conventional threaded fastening units 66 may be utilized to effect the connection between the member 60 and the side of the fuel tank 24. A lower portion 68 of the handle member 50 extends beneath the underside 29 of the first unitary assembly 2. The lower portion 68 extends generally transversely of the longitudinal median plane 11 and is connected with the leg 58 of the handle 52 at junction 70 by conventional threaded nut and bolt fastening apparatus 72. By this arrangement, the handle 52 with an extension of leg 56 defined by the second unitary assembly 22, is connected with the upper portion 62 and the lower portion 68 of the overall handle arrangement 50 to define a generally cage-like handle structure.

The cage-like structure is defined by the arrangement comprising the overall handle means 50, extending transversely of the longitudinal median plane 11 and further comprising the second unitary assembly 22 and handle portion 54, extending generally longitudinally of the median plane 11. The vibration isolation units 44 and 46 and 48 are operable to resiliently support the first unitary assembly 2 within this cage structure. The vibration isolation units 44, 46 and 48 may be longitudinally aligned with the longitudinal median plane 11. While the vibration isolation unit 48, as shown in FIG. 7, may be slightly displaced from this median plane, and while unit 44 may be slightly off center, it will be recognized that a common plane passing substantially adjacent or contiguous with the plane 11 will intersect each of the units 44, 46 and 48. In this manner, the vibration isolation units 44, 46 and 48 define a generally triangular resilient support network cradling the assembly 2 within the cage-like structure.

Preferably, the units 44, 46 and 48 may be arranged in a plane in a more or less equilateral triangular configuration, generally symmetrically arranged with respect and surrounding the center of mass of the first unitary assembly 2. This center of mass will be more or less adjacent the axis of rotation 10 in many commercial chain saw embodiments. Thus, the vibration isolation units 44, 46 and 48 are, in some embodiments, disposed more or less radially equidistant from the center mass of the vibration generating assembly 2. It will be noted that the unitary vibrating assembly 2 is supported within the cage framework so as to be disposed within an opening 74 defined by the handle arrangement 50. The opening 74, itself, extends generally in alignment with the longitudinally extending plane 11. The unitized assembly 2, disposed within the opening 74, may be supported between the leg extension defining assembly 22 and the leg 58. In this configuration, the handle arrangement 50 serves to provide a force transmitting connection between the leg defining assembly 22 and the leg segment 52. The force transmission is facilitated by the horizontally displaced, side portions 76 and 78 of the overall handle arrangement 50 which side portions are disposed laterally outwardly of the superposed assemblies 22 and 2.

With this arrangement of components, the vibration isolating units 44, 46 and 48 are effective to absorb vibration energy in a multiplicity of directions, generally aligned with the principal vibration plane which extends generally parallel with the longitudinal median plane 11.

STRUCTURAL DETAILS OF VIBRATION ISOLATION SYSTEM HAVING BUMPER FEATURE ACCORDING TO THE PREFERRED EMBODIMENT

Figure 6:
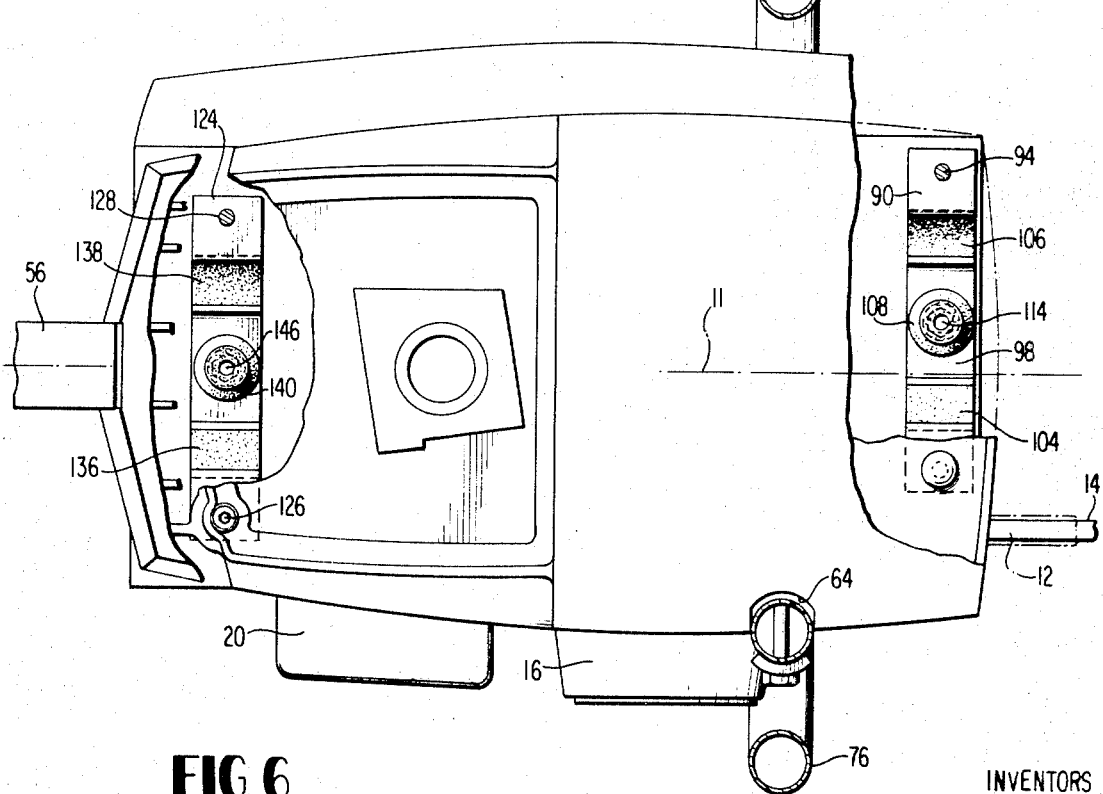
FIG. 6 is a top plan, partially fragmentary, view of the FIG. 2 assembly, illustrating, in top plan view, the structural details of the shock absorbing units and the bumper devices shown in cross sectional FIGS. 3 and 4.

The structural details of the first shock absorbing unit 44 combined with a bumper device are best shown in FIGS. 3 and 6.

The vibration absorbing unit 44 includes first, second, third and fourth planar walls 80, 82, 84 and 86, respectively, all of which extend generally parallel with the aforementioned plane 11. Walls 80 and 84 are disposed, respectively, on opposite sides of the median plane when properly arranged within the chain saw in accordance with the present invention. Walls 82 and 86 are located laterally outwardly, respectively, of the walls 80 and 84. The walls 82 and 86 include mounting bracket portions 88 and 90 which are connected to an underwall portion 92 of the assembly 22 by threaded fastening means 94 and 96.

The walls 80 and 84 are interconnected by a transversely extending, force transmitting web 98 which extends generally tangentially and externally of the cylinder or engine housing 6 and is mounted on a housing portion 100 of the cylinder or engine housing by threaded fastening means 102.

104 of first, generally rhomboidal mass 104 elastomeric material such as natural rubber is disposed between and is bonded to the wall members 80 and 82. The mass 104 projects generally outwardly of wall 80 and upwardly away from the assembly 2 toward the wall 82. Another rhomboidal elastomeric mass 106, related in mirror-image fashion to mass 104, extends laterally between the walls 84 and 86.

An elastomeric bumper member 108 may be disposed within the U-shaped space defined by the two walls 80 and 84 and the horizontal web portion 98 connecting the two walls 80 and 84. The bumper member 108 may be secured to the assembly by means of a metallic disc-like base 110 which is embedded within the bumper member 108 and extends in a radial plane thereof. The disc-like metallic base 110 of the bumper member 108 is, in turn, secured to an upper portion 112 of the threaded fastening member 102 which operates to secure the overall vibration isolation unit to the casing 100.

The bumper member 108 generally comprises a somewhat cylindrical elastomeric body which gently tapers toward the upper portion thereof when the chain saw is oriented in the upright operational posture. The body of the bumper member 108 may be formed with an axially extending bore hole 114 which is operable to lessen the firmness of the upper portion 116 of the bumper member 108. The upper portion 116 of the bumper may be disposed in minimum pressure contact with a lower surface 118 of the housing wall 92. The diameter of the bore hole 114 may be approximately one-third the median diameter of the overall body of the bumper member 108 and may extend through approximately one-half the axial length thereof.

It may be preferred to provide a body length for the bumper member 108 which provides a predetermined clearance between the upper surface 116 of the bumper member 108 and the lower surface 118 of the wall 92 comprising a portion of the inertial mass unitary assembly 22. This clearance may be operable to permit normal cyclic movement between the assemblies 2 and 22 but to prevent unusual relative movements between the two assemblies which movement may apply sufficient strain on the rhomboidal elastomeric masses 104 and 106 to cause the failure thereof. Also, the bumper 108 is operable to absorb the shock loading caused by vibration when the masses 104 and 106 are under an unusual strain which may ordinarily reduce the vibration absorbing capability of the masses 104 and 106.

The second vibration isolation unit 46 (shown in FIG. 4) may be substantially identical with the aforementioned vibration isolation assembly 44. Thus, the second vibration isolation assembly includes fifth, sixth, seventh and eighth wall means 120, 121, 123 and 125 all of which are disposed generally parallel to longitudinal plane 11. Walls 121 and 125 are disposed laterally outwardly of walls 120 and 123 and are connected through flanges 122 and 124 by nut and bolt assemblies 126 and 128 with an under-wall portion 130 of the overall inertia mass assembly 22. The walls 120 and 123 are interconnected by a force transmitting web 132 which extends generally tangentially and externally of the cylinder 6 and is connected by threaded fastening means 134 to an upper portion of the vibration generating unitary assembly 2 as defined with reference to FIG. 1. The walls 120 and 121 are interconnected by a third rhomboidal mass 136 and the walls 123 and 125 are connected by a fourth rhomboidal mass 138. The rhomboidal masses 136 and 138 are oriented substantially in the manner described in relation to the rhomboidal masses 104 and 106 of FIG. 3. It should be here noted that the second vibration absorbing means 46 is mounted generally symmetrically in relation to longitudinal median plane 11, with the walls 120 and 123 disposed, respectively, on opposite sides of the plane.

A movement limiting bumper device 140 may be disposed within the U-shaped space defined by the parallel walls 120 and 123 and the base web connecting member 132. The bumper member 140 may be identical with bumper member 108 shown in FIG. 3 and secured to the vibration isolation unit 46 by means of a metallic disc-like base portion 142 thereof which may be welded or secured by any known means to an upper portion 144 of the threaded fastening means 134. The bumper member 140 may be of a generally cylindrical configuration having a slight taper toward the upper terminal axial end thereof. An axially extending bore hold 146 may be formed within the body of the bumper member 140 and serve the same purpose as the bore hole 114 of the bumper member 108 shown in FIG. 3 of the drawings.

Once again, it is preferred that the surface 150 of the bumper be normally in minimum pressure contact with the lower surface 148 of the wall 130. However, a clearance may be provided between the lower surface 148 of the wall 130 and the upper surface 150 of the bumper member 140 so that normal cyclic relative movement is permitted between the surfaces. It has been commercially found, that the bumper 140 shown in FIG. 4 and associated with the specific vibration isolation unit 46 may not be necessary in some embodiments of the present invention. However, it has been discovered that, under unusually high loads without the provision of bumper member 140 disposed in the manner shown in FIG. 4 with respect to the vibration isolation unit 46, undesirable relative movement between the assemblies 2 and 22 may result.

The third vibration isolation assembly 48 includes ninth and tenth wall means 101 and 103, each extending generally parallel with the plane 11.

Wall means 101 is connected by threaded fastening means 105 to one side 107 of handle leg 52. Wall means 103 is connected by threaded fastening means 109 to a bracket 111. Bracket 111, as shown in FIGS. 2 and 5, is connected with under portions 113 and 115 of the housing 4 of the first assembly 2. A fifth generally cylindrical, plug-like mass 117 of elastomeric material extends generally laterally between and is bonded to, the walls 101 and 103. Mass 117, like masses 104, 106, 136 and 138, is solid elastomeric material, not intersected by vibration absorption impeding mounting means.

As illustrated in FIG. 2, the generally longitudinal position of the third vibration isolation means 48 is located within or intermediate the longitudinal extremities defined by the locations of the first and second vibration isolating units 44 and 46. Somewhat similarly, the junction between force transmitting member 60 and second assembly 22 is also located intermediate the longitudinal extremities defined by the locations of the units 44 and 46.

Referring to FIGS. 1 and 2, it can be seen that two additional bumper units 200 and 201 may be provided and mounted on a surface 202 of the lower handle portion 58 which is sometimes referred to as a "skid."

The bumper member 200 is provided for preventing the lower surface 209 of the vibration generation unitized assembly 2 from bottoming on the surface 202 when the guide bar 14 is forcibly applied to a piece of wood to be cut. The bumper unit 200 may be similar in configuration to the bumper units 108 and 140 shown in FIGS. 3 and 4, respectively. It has been found, in several commercial embodiments of the chain saw of the present invention, that the fourth bumper unit 201 may not be necessary.

The bumper 201 is disposed on surface 202 of the "skid" between the mount 48 and the handle junction 70. The bumpers 200 and 201 cooperate with the vibration absorbing mount 48 in the same synergistic manner as the interaction of the bumpers 108 and 140 with respect to the vibration isolation units 44 and 46. Bumper 201 is in minimum pressure contact with casing surface 207 and bumper 200 with surface 209.

It should be understood that any number of the four bumpers 108, 140, 200 and 201 may be used in combination with mounts 44, 46 and 48 without departing from the invention.

A flexible or elastomeric bellows 186 may be provided to extend generally between the superposed second assembly 22 and the first vibration generating assembly 2. As indicated in FIG. 8, the lower end 188 of the bellows 186 may be connected with an inlet port 196 in the cylinder 6. An upper end 190 of the bellows 186 may be connected with a discharge end of the induction passage 36 of the carburetor 28. The bellows 186 thereby defines a central passage 192, which may be circumscribed by a flexible telescoping wall 194 and is operable to transmit a fuel and air mixture from the carburetor 28 to an air inlet port 196 in the cylinder 6. The ends 188 and 190 of the bellows 186 may be biased into fluid sealing engagement with the port 196 and a wall portion 198 of the assembly 22 adjacent the passage 36 of the carburetor 28 by an internal, helical, coiled spring 199. The bellows 186 may be located generally symmetrically with respect to the plane 11 and may be disposed longitudinally intermediate of and shielded both laterally and longitudinally by the first and second vibration isolation units 44 and 46.

Alternatively, the terminal ends 188 and 190 of the bellows may be clamped to the ducts 36 and 196 in any conventional manner.

SUMMARY OF SOME OF THE ADVANTAGES OF THE PRESENT INVENTION

It can thus be seen that an improved vibration isolation system has been herein provided wherein unusual strain, which tends to tear vibration isolation units which are designed to absorb vibrations in a plane of shear, is precluded. Consequently, softer elastomeric masses may be practically utilized for efficiently absorbing vibrational energy. The synergistic mode of operation is such that the vibration isolation and bumper members of each unit cooperate uniquely to improve the vibration absorbing quality of the vibration isolation unit while preventing the failure thereof. It is well known that, when vibration isolation units have been deformed beyond a certain point, the vibration absorbing quality thereof is reduced. Therefore, by providing a bumper device with such vibration isolation units, which bumper provides soft compressive absorption of shock loading, the overall vibration absorbing capability of the system is improved.

The provision of bumper members according to the present invention also operates to stabilize a saw as an operator grasps the handle portion 56 of the inertial mass assembly 22 and operates the machine by controlling a trigger type throttle control 282.

The general planar alignment of principal vibration sources and the orientation of shock absorbing units in general alignment with this plane provides a unique and vastly improved vibration isolation effect. This effect is maximized when the shock absorbing feature of the present invention is used in combination with vibration isolation units. Due to the cooperation of these combined units, an upper pull exerted by an operator on the handle portions 56 and 50 of the chain saw will tend to lift the entire chain saw rather than to impose separation forces on the units 44, 46 and 48 supporting the vibration generating unitized assembly 2 within the inertial mass assembly 22.

The absorption of vibration in both compression and shear simultaneously has been unexpectedly found to produce results superior to those produced by absorbing energy solely in shear or compression. Since relative movement between the two principal assemblies of the chain saw may be limited to any desired degree by the present invention, metal-to-metal contact may be absolutely precluded during the normal or even unusual operation of a chain saw incorporating the present invention.

The placement of the bumper units 108 and 140 between the associated rigid walls serves to shield the elastomeric bumper units from damaging flying chips or the like.

The placing of the bumper devices in minimal pressure contact with an opposing surface to be vibration dampened provides better energy absorption results than when the bumper device is spaced from such an opposing surface.

The arrangement of the movement limiting bumper units generally within the primary plane of vibration precludes lateral tilting of the principal assemblies of a chain saw about the longitudinal extension thereof. Also, it has been discovered that "corner diving" or tilting of the assemblies 2 and 22 in a direction askew to the major axes of the saw is minimized, Of course, some misalignment from the primary plane is tolerable. The aforesaid arrangement may reduce the number of bumper members necessary to effectively limit damaging movement and, thereby, reduce any degree of stiffness such bumper members might add to the vibration isolation system to an acceptable minimum. The overall combined units and the unique arrangement thereof provide a force transmitting and stabilizing feature for a chain saw which feature is independent of the structures of the principal assemblies 2 and 22.

While what has been described are the preferred and several alternative embodiments of the present invention, it should, of course, be understood that various modifications and changes may be made therein without departing from the invention. It is therefore intended to cover in the following claims all such modifications and changes as may fall within the true spirit and scope of the invention.

One example of such a modification may be the use of two laterally spaced elastomeric blocks to replace the bumper unit 140. Such a modification may be required when the configuration of the upper surface 148 includes a longitudinally extending structural rib which may interfere with the mounting of a single bumper unit 140.

We claim:

1. In a chain saw machine comprising engine means, cutter chain means, the engine means being drivingly connected with the cutter chain means, the engine means including a crank having an axis of rotation, the engine means and the cutter chain means comprising a vibration generating first assembly, inertia mass means including a fuel tank comprising a vibration dampening second assembly, a plurality of vibration isolation units interconnecting the first and the second assemblies, and the vibration isolating units being operable to impede the transmission of vibration between the first and the second assemblies, and wherein the vibration isolating units include at least one generally U-shaped member comprising two parallel members connected to a generally transversely extending web member by elastomeric vibration absorbing masses and wherein the parallel members are rigidly attached to one of the first and second assemblies and the web member is rigidly attached to the other of the first and second assemblies, the improvement comprising:

resilient bumper means disposed generally adjacent at least one of the vibration isolating units;

the cutter chain means and the axis of rotation of the crank being arranged to form a primary plane of vibration for the overall chain saw machine;

said resilient bumper means and the vibration isolating units being aligned to absorb shock energy directed generally along said primary plane of vibration;

said resilient bumper means comprising at least one generally cylindrical elastomeric mass disposed between the parallel members of the at least one generally U-shaped member; and said at least one elastomeric mass being arranged with the axis thereof extending parallel with a longitudinal extension of the parallel members and being generally aligned within said primary plane of vibration.

2. An improvement according to claim 1 wherein:

the vibration isolating units of the chain saw machine are operable to absorb vibrational shock energy in shear during the operation of the chain saw machine; and said resilient bumper means disposed adjacent at least one of the vibration isolating units is simultaneously operable to absorb vibrational shock energy in compression during the operation of the chain saw machine.

3. An improvement according to claim 1 wherein said resilient bumper means is arranged to limit the movement of said first assembly with respect to said second assembly to a degree wherein said vibration isolation units operate only within an efficient range.

4. An improvement according to claim 1 wherein:

an elastomeric mass is mounted on an upper portion of the handle member rigidly attached to the second assembly and extending beneath the vibration generating first assembly within the primary plane of vibration when the chain saw machine is oriented to cut in a vertical plane; and wherein said elastomeric mass on said upper surface of said handle is operable to absorb shock energy upon the impaction of the first assembly thereagainst as the first assembly is forced to move in a direction toward said handle member of the second assembly.

5. An improvement according to claim 1 wherein said generally cylindrical elastomeric mass disposed between the parallel members of the at least one U-shaped member is secured to the web member at a base axial end of said elastomeric mass and is formed to taper toward a free axial end thereof; and said generally cylindrical elastomeric mass is provided with an axial bore hole extending from said free end partially through the longitudinal length thereof.

6. An improvement according to claim 5 wherein:

a radially extending surface comprising a terminal portion of said free end of said generally cylindrical elastomeric mass is in minimum pressure contact with a surface comprising a portion of the one of the first and second assemblies rigidly connected with the parallel members of the at least one U-shaped vibration isolating unit.

7. In a chain saw machine comprising engine means, cutter chain means, the engine means being drivingly connected with the cutter chain means, the engine means including a crank having a axis of rotation, the engine means and the cutter chain means comprising a vibration generating first assembly, inertia mass means including a fuel tank comprising a vibration dampening second assembly, a plurality of vibration isolation units interconnecting the first and the second assemblies, and the vibration isolating units being operable to impede the transmission of vibration between the first and the second assemblies, the improvement comprising:

resilient bumper means disposed generally adjacent at least one of the vibration isolating units;

the cutter chain means and the axis of rotation of the crank being arranged to form a primary plane of vibration for the overall chain saw machine;

said resilient bumper means and the vibration isolating units being aligned to absorb shock energy directed generally along said primary plane of vibration; and a handle member rigidly attached to the second assembly and extending beneath the vibration generating first assembly along the primary plane of vibration when the chain saw machine is oriented to cut in a vertical plane;

elastomeric means mounted on an upper portion of said handle member;

said elastomeric means on said upper portion of said handle member being operable to absorb shock energy upon the impaction of the first assembly thereagainst as the first assembly is forced to move in a direction toward said handle member and the second assembly; and said elastomeric means on said upper portion of said handle member includes first bumper means disposed generally beneath a rear portion of said engine means and second bumper means disposed generally beneath a forward portion of said engine means.

8. An improvement according to claim 7 wherein said first and said second bumper means are disposed in minimum pressure contact with an opposing surface to be vibration dampened.

9. In a chain saw machine comprising engine means;

cutter chain means;

the engine means being drivingly connected with the cutter chain means;

the engine means including a crank having an axis of rotation;

the engine means and the cutter chain means comprising a vibration generating first assembly;

inertia mass means including a fuel tank and comprising a vibration dampening second assembly; and a plurality of vibrating isolation units interconnecting the first and the second assemblies;

the vibration isolating units including shear means operable to impede the transmission of vibration between the first and the second assemblies by absorbing vibrational energy in shear;

the cutter chain means and the axis of rotation of the crank being generally arranged to form a primary plane of vibration for the vibration generating, first assembly; and the improvement comprising:
at least one resilient bumper means disposed generally adjacent but operably independent of at least one of the vibration isolating units;

said resilient bumper means and the vibration isolating units being generally aligned to concurrently absorb energy directed generally longitudinally of said primary plane of vibration, and limit convergence of said first and second assemblies and prevent non-yielding, impacting contact therebetween; and said bumper means being operably independent of said shear means and operable to limit said convergence by compressively engaging one of said first and second assemblies.

10. An improvement according to claim 9 wherein:
the vibration isolating units of the chain saw machine are operable to absorb vibrational shock energy in shear during the operation of the chain saw machine; and said resilient bumper means is disposed generally adjacent at least one of the vibration isolating units and is operable to absorb vibrational shock energy in compression during the operation of the chain saw machine.

11. An improvement according to claim 9 wherein:
said resilient bumper means is arranged to limit the movement of said first assembly with respect to said second assembly to a degree wherein said vibration isolating units operate only within an efficient range.

12. An improvement according to claim 9 wherein:
the vibration isolating units include at least one generally U-shaped unit comprising
two members spaced generally transversely of said primary plane of vibration,
a generally transversely extending web member,
elastomeric vibration absorbing masses interconnecting said web member and said two spaced members,
said two spaced members being rigidly attached to one of the first and second assemblies, and
said web member being rigidly attached to the other of the first and second assemblies,
said resilient bumper means comprises
at least one, generally cylindrical elastomeric means disposed between the two spaced members of the at least one, generally U-shaped member; and
said at least one generally cylindrical elastomeric means is arranged with the axis thereof extending generally longitudinally of said primary plane of vibration.

13. An improvement according to claim 16 wherein:
said generally cylindrical elastomeric means
is disposed between the two spaced members of the least one U-shaped unit,
is secured to the web member at a base axial end of said elastomeric means, and
is formed to taper toward a free axial end thereof; and
said generally cylindrical elastomeric means is provided with an axial bore hole extending from said free axial end at least partially through the longitudinal length thereof; and
a radially extending surface, comprising a terminal portion of said free axial end of said generally cylindrical elastomeric means, is disposed in minimum pressure contact with a surface comprising a portion of the one of the first and second assemblies which is connected with the two spaced members of the at least one U-shaped vibration isolating unit.

14. In a method for absorbing vibrational energy within a chain saw machine comprising the steps:
isolating vibration generating members in a first assembly;
providing a vibration dampening inertia mass comprising a second assembly;
superposing the first and second assemblies and forming a primary plane of vibration;
connecting the first and second assemblies together by vibration isolating connector units including shear means operable to absorb vibrational energy primarily in shear;
the improvement residing in:
providing bumper means independent of said shear means to elastomerically, and acting in compression, limit the relative converging movement between the first and second assemblies; and
disposing both the bumper means and the connector units in general alignment with a plane extending generally longitudinally of the primary plane of vibration
limiting said converging movement by causing said bumper means to compressively engage at least one of said first and second assemblies.

* * * * *

UNITED STATES PATENT OFFICE
CERTIFICATE OF CORRECTION

Patent No. 3,698,455  Dated October 17, 1972

Inventor(s) Frederickson et al

It is certified that error appears in the above-identified patent and that said Letters Patent are hereby corrected as shown below:

Column 1, line 48, after "al" insert a period (.)

Column 2, line 11, after "an" omit "i".

Column 5, line 2, after "generally" change "Uhaped" to -- U-shaped -- .
Column 5, line 2, "U-shaped end portion" should not be in boldface type.

Column 6, line 47, change "104 of" to -- A -- .
Column 6, line 47, after "mass 104" add -- of -- .

Column 8, line 4, change "hold" to -- hole -- .

Column 10, line 33, after "minimized" change the comma (,) to a period (.)

Claim 7, line 4, after "having" change "a" to -- an -- .
Claim 7, line 14, after "units" change the colon (:) to a comma (,).

Claim 9, line 29, after "absorb" insert -- shock -- .

Claim 13, line 1, after "claim" change "16" to -- 12 -- .
Claim 13, line 4, after "the" insert -- at -- .

Signed and sealed this 10th day of April 1973.

(SEAL)
Attest:

EDWARD M. FLETCHER, JR.
Attesting Officer

ROBERT GOTTSCHALK
Commissioner of Patents